May 26, 1970    D. C. PRICE    3,513,684
METHOD OF MAKING PLATE METAL PRODUCT WITH TWO-WAY EXTRUDED NUT
Original Filed Jan. 4, 1966

INVENTOR.
Don C. Price
BY
Frease & Bishop
ATTORNEYS

United States Patent Office 3,513,684
Patented May 26, 1970

3,513,684
METHOD OF MAKING PLATE METAL PRODUCT WITH TWO-WAY EXTRUDED NUT
Don C. Price, Canton, Ohio, assignor, by mesne assignments, to The Monarch Rubber Company, Hartville, Ohio, a corporation of Delaware
Original application Jan. 4, 1966, Ser. No. 518,633, now Patent No. 3,358,546. Divided and this application Nov. 13, 1967, Ser. No. 682,257
Int. Cl. B21c *37/02;* B21d *28/00, 31/00, 53/24*
U.S. Cl. 72—340                                                      3 Claims

ABSTRACT OF THE DISCLOSURE

A method of making a one-piece plate metal product having an integral tubular sleeve projecting axially beyond and joined to both surfaces by piercing a hole in the plate blank, shaving the hole to eliminate metal break-out, reforming the blank around the hole to dome shape, extruding a sleeve in the dome formation to project from the concaved dome surface, then rearwardly extruding blank metal from the dome shape in the opposite direction and flattening the blank to provide sleeve portions projecting from both surfaces, and then roll-tapping the inner surface of the sleeve.

CROSS REFERENCE TO RELATED APPLICATION

This application is a division of my copending application, Ser. No. 518,633, now Patent No. 3,358,546, filed Jan. 4, 1966 and allowed July 28, 1967; and the invention comprises improvements upon the extruded sleeve manufacture set forth in my copending applications, Ser. No. 411,753, now Patent No. 3,365,926 filed Nov. 17, 1964 and allowed Sept. 22, 1967, and Ser. No. 514,277, now Pat. No. 3,412,593 filed Dec. 16, 1965.

BACKGROUND OF THE INVENTION

Field of the invention

The invention relates to the manufacture of a plate metal product, having an extruded integral tubular sleeve, neck, ring, or thimble which may be formed internally with threads, and which sleeve projects two ways from the plate, that is from both surfaces of the plate metal blank from which the sleeve is extruded. More particularly, the invention relates to the manufacture of such plate metal products in which the sleeve wall thickness is sufficient to permit threads to be formed therein having a thread profile in excess of 75% of full thread profile; and in which the extruded sleeve length and thus the number of threads which may be formed in such sleeve is substantially greater than the wall thickness of the plate metal blank from which the sleeve projects in two directions.

Similarly, the invention relates to a procedure which provides a plate metal part having an integral threaded sleeve wherein the distance that the sleeve may project from any one surface is restricted, of a substantially greater effective sleeve length so that a sufficient number of threads may be formed in the sleeve to sustain high torque loading, which number of threads could not be formed in a sleeve having a projected length from one surface only within the restriction requirements.

The advent of plate metal products with extruded integral threaded sleeves which provide integral threaded fasteners has created a demand for different sleeve structure arrangements, longer sleeve lengths, and more sleeve threads than heretofore was possible to produce.

Further, there is a demand for incorporating pilot means on both surfaces of a plate metal part having an integral threaded sleeve, for accurately locating the part and sleeve with respect to another part assembled therewith and in contact with either of the two surfaces of the threaded sleeve-containing part.

Description of the prior art

No procedure is known in the prior art which may be used to form a sleeve projecting from both surfaces of a plate metal blank having an inner sleeve opening surface of uniform diameter and preferably threaded throughout its length, with the length of the sleeve equal to at least twice the thickness of the plate metal wall and with outer projecting sleeve surface concentric with the inner sleeve opening surface.

SUMMARY OF THE INVENTION

I have discovered a new procedure which enables an integral sleeve to be extruded in two directions from a plate metal part so that a sleeve of substantial length and sleeve thickness is provided, thus enabling a substantial number of threads to be formed in the sleeve and enabling the effective length of the sleeve to be increased while satisfying restrictions as to the distance that the sleeve may project from any one surface of a plate metal part involved, and thereby also providing pilot means on both surfaces of the part for the accurate assembly of the plate metal part with another component, while at the same time retaining all the benefits, new characteristics and advantages of extruded sleeve structures integral in plate metal products, either unthreaded or threaded, and of their manufacture.

Accordingly, it is an object of the present invention to provide a new procedure for making a plate metal product having an extruded integral sleeve formed therein which may be threaded and which extends from both surfaces of the plate metal blank from which the sleeve is extruded; to provide for the manufacture of a plate metal product having an extruded integral sleeve formed therein and having pilot means extending from both surfaces of the plate metal part for the accurate location of the sleeve-containing part with reference to another part assembled therewith in contact with either of the two plate metal part surfaces; to eliminate difficulties heretofore existing in the art; and to obtain the indicated objects in a simple, effective and inexpensive manner, thereby satisfying needs existing in the art.

These and other objects and advantages apparent to those skilled in the art from the following description and claims may be obtained, the stated results achieved, and the described difficulties overcome by the methods, steps, procedures and discoveries which comprise the present invention, the nature of which is set forth in the following general statement, preferred embodiments of which—illustrative of the best modes in which applicant has contemplated applying the principles—are set forth in the following description and shown in the drawing, and which are particularly and distinctly pointed out and set forth in the appended claims forming part hereof.

The nature of the invention may be stated in general terms as preferably including in the manufacture of a plate metal product having an extruded sleeve projecting integrally from both surfaces of the product, the steps of providing a plate metal, preferably steel, blank; piercing a hole in the blank; then shaving the annular surface of the pierced hole to eliminate normal metal breakout resulting from piercing; then reforming the metal in the blank annularly around the shaved hole to dome-like formation with opposite concave and convex surfaces; then cold extruding a tubular sleeve of desired leagth from blank metal in the dome-like formation surrounting the shaved hole to project from said concave surface portion of the blank; then further cold working the blank and rearwardly cold extruding blank metal from the dome-like formation in the opposite direction; meanwhile during rearward extrusion reforming the blank metal to flatten the blank and eliminate the dome-like formation and to provide sleeve portions projecting from both surfaces of the flattened metal blank; and then preferably roll-tapping the inner metal surface of the tubular metal sleeve.

BRIEF DESCRIPTION OF THE DRAWINGS

By way of example, the improved procedures for the manufacture of the new product are shown somewhat diagramatically in the accompanying drawing forming part hereof in which.

Similar numerals refer to similar parts throughout the various figures of the drawing.

DESCRIPTION OF THE PREFERRED EMBODIMENTS

The improved product is shown in FIGS. 6, 7, 8, and 9. The method of manufacture thereof is illustrated diagrammatically in FIGS. 1 to 7, die means for the rearward cold extrusion step being illustrated in FIG. 8.

While the drawings indicate one or two sleeves formed in one plate metal blank, any number of sleeves may be formed by duplicating the dies and other tools used at various stages of the procedure. Also, the blank is not necessarily merely a flat blank but may have flanges formed therein at certain stages to form the shape of metal stamping desired.

Figure 1:
FIG. 1 is a sectional view of a sheet or plate metal blank in which the improved integral sleeve is to be extruded.
Figure 2:
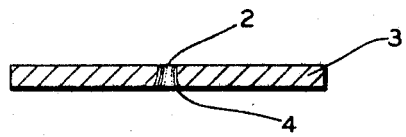
FIG. 2 is a somewhat diagrammatic sectional view illustrating the first or piercing step carried out.

The manufacturing steps illustrated in FIGS. 1 through 5 may be carried out as set forth in detail in my copending application Ser. No. 514,277, filed Dec. 16, 1965 to provide a sleeve projecting integrally from the concave face of a dome-like formation in the metal blank. Briefly, these steps involve providing a metal blank 1 (FIG. 1) of required size and thickness to form the desired finished stamped plate metal component from which an integral sleeve projects. Blank 1 is pierced in the usual manner to form a pierced opening 2 in intermediate blank 3 (FIG. 2). Metal breakout at the bottom of pierced hole 2 occurs, diagramatically indicated at 4 in FIG. 2.

Figure 3:
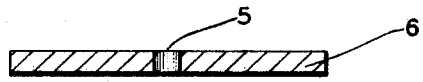
FIG. 3 is a diagrammatic sectional view illustrating the next or shaving step.
Figure 4:
FIG. 4 is a diagrammatic view illustrating the next step carried out to reform the metal with a dome-like formation around the shaved hole of FIG. 3.
Figure 5:
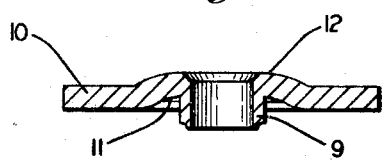
FIG. 5 is a similar view illustrating an integral sleeve cold extruded in one direction from the intermediate blank of FIG. 4.

For successfully extruding a sleeve of any substantial length and wall thickness from a relatively thick plate metal blank, the metal breakout 4 must be removed. This is preferably carried out by a shaving operation in which a punch is used to form a truly cylindrical shaved hole 5 in shaved blank 6 (FIG. 3).

Next, a dome-like formation 7 is formed by cold working the shaved blank 6 to form the reformed intermediate blank 8. Intermediate blank 8 then is extruded in cold extrusion dies to form the integral extruded sleeve 9 in intermediate blank 10 projecting from the concave surface 11 of dome-like formation 12 which still is retained in blank 10 originating from the similar dome-like formation 7 in blank 8.

Figure 8:
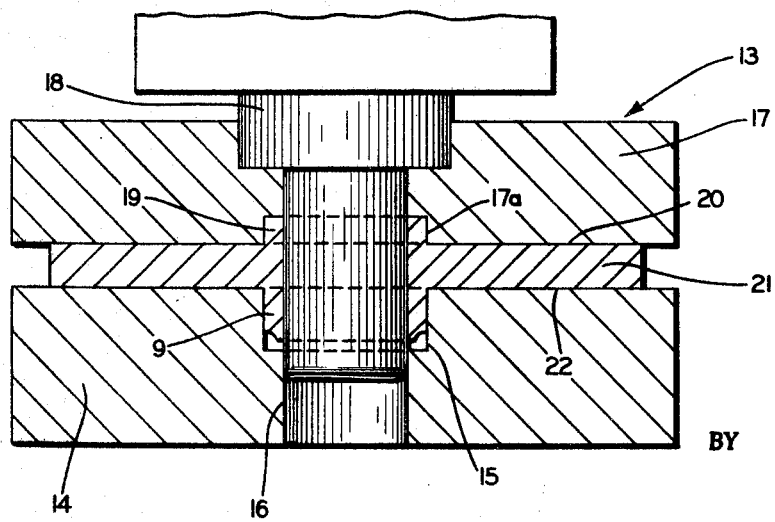
FIG. 8 is a diagrammatic fragmentary sectional view of die means for rearwardly cold extruding the intermediate blank of FIG. 5 to form the final two-way extruded blank of FIG. 6.

In accordance with the invention, intermediate blank 10 then is cold worked in die means generally indicated at 13 in FIG. 8 including a lower die 14 having a die cavity 15 surrounding the upper end of the punch-receiving opening 16. The upper die includes an upper member 17 having a cavity 17a and punch 18 which on downward movement of upper member 17 and punch 18 rearwardly extrudes a sleeve portion 19 from the dome-like formation 12 in intermediate blank 10. Rearwardly extruded sleeve portion 19, as shown, has the same wall thickness as extruded portion 9 and projects upward from the top surface 20 of plate metal product 21 in axial alignment with the sleeve portion 9 which projects downward from the bottom surface 22 of formed product 21. During the rearward cold extrusion of sleeve portion 19 in the die means 13 of FIG. 8, the intermediate blank 10 is flattened to eliminate the dome-like formation 12, as shown, and metal which forms the sleeve portion 19 flows from the metal in the prior dome-like formation 12.

The two-way extruded plate metal component 21 provides a plate metal product that may be used for many purposes. Thus, either the interior or the exterior of the sleeve portions 9 and 19 which project from the two surfaces of component 21 may be used to pilot the location of the sheet metal product 21 with respect to other parts in an assembly of a sleeve-containing product 21 with other components. In other instances, the sleeve opening 23 is threaded.

When the sleeve is to be threaded, the interior surface of sleeve opening 23 is drilled to remove a thin skin of metal as described in said application Ser. No. 411,753. This drilling operation removes burrs or score marks which may have resulted from the cold extrusion operations. Also, it removes any contaminating material which may be present on the sleeve opening surface. Next, it provides a close tolerance sleeve hole size in preparation for a subsequent tapping operation. Finally, it removes a thin skin of work-hardened metal which exposes clean stress-relieved metal to be tapped.

The sleeve is then tapped by a roll-tapping operation, preferably with a fluteless roll thread tap to form desired threads in the sleeve without metal loss by cold working the metal in the interior in the sleeve to establish the thread profile. The sleeve threads are indicated generally at 24 in FIG. 7 which illustrates a finished tapped plate metal product 25 having an extruded integral threaded tubular sleeve with a portion 26 projecting from the upper surface and a portion 27 projecting from the lower surface of product 25.

These projecting sleeve portions 26 and 27 as shown have different lengths. However, these lengths may be controlled to be the same if desired by controlling the amount of forward and rearward extrusion performed in producing intermediate extruded blank 10 and rearwardly extruded blank 21. Furthermore, the inner and outer surfaces of sleeve portions 9 and 19 of extruded product 21 or of sleeve portions 26 and 27 of tapped extruded product 25 are concentric. Thus, any of these surfaces may be used as an accurate pilot reference with respect to the location of the sleeve axis.

Figure 9:
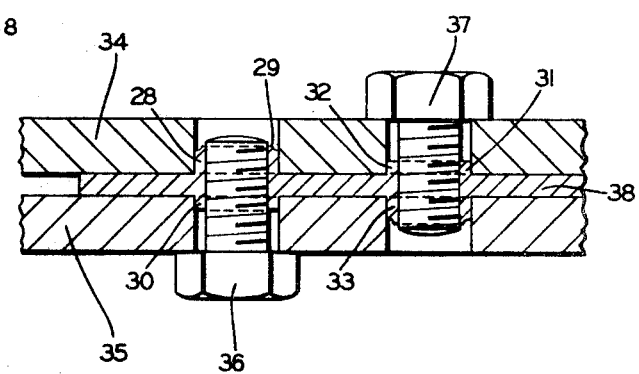
FIG. 9 is a fragmentary sectional view of a plate metal product incorporating a plurality of two-way extruded sleeves and illustrating how the projecting sleeve portions may pilot the assembly of the product with respect to other components.

FIG. 9 illustrates a stamped plate metal product having two improved extruded sleeves formed therein in which one sleeve 28 has a longer sleeve portion 29 projecting from the top surface of the metal product 38 than the sleeve portion 30 projecting from the bottom surface of product 38. The other sleeve 31 has the reverse arrangement in which the sleeve portion 32 projecting from the top surface of the product 38 is shorter than the sleeve portion 33 projecting from the bottom surface of the product 38.

FIG. 9 also shows how the product 38 may be assembled with separate components 34 and 35 engaged with either the top or bottom surfaces of the product 38 and any of the sleeve portions 29, 30, 32, and 33 piloted in an opening in one or the other of the components 34 or 35. The sleeves may be connected by bolts 36 or 37 with one or the other of the components.

Figure 6:
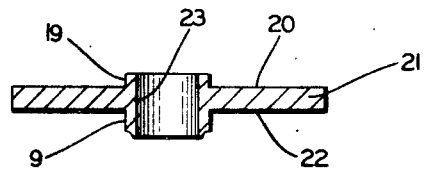
FIG. 6 is a view similar to FIG. 5 illustrating the next step of extruding the metal in the other direction from the blank and flattening the blank around the sleeve to eliminate the dome-like formation.
Figure 7:
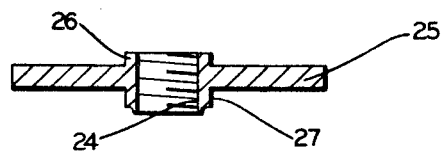
FIG. 7 is a view similar to FIG. 6 showing the sleeve threaded.

Referring to FIG. 6, for example, the plate metal in formed product 21 may be 0.180" thick, sleeve portion 9 may project 1.110" from the undersurface of the product and sleeve portion 19 may project 0.070" from the upper surface of product 21. Thus, the sleeve length is twice the thickness of the plate metal from which the sleeve portions are extruded. This sleeve length may be increased by extruding either of sleeve portions 9 and 19 to a greater length.

The wall thickness of the sleeve portions 9 and 19 may be from 0.075" to 0.085" thick and threads having the shape of ½"–13 threads per inch threads may be formed in the sleeve.

Two aspects of the invention are apparent in that either of the sleeve portions projecting from the faces of the plate metal part may be used to pilot the location of the part when assembled with another component. Also, the sleeve may have an extended length in which a desired increased number of threads may be formed, without projecting the distance from either surface of the product that would be required to provide such extended sleeve length if the sleeve only projected from one surface of the product.

Accordingly, the present invention provides a new procedure for the manufacture of a plate metal part with an extruded integral tubular preferably threaded sleeve from heavy gauge metal with sleeve portions projecting from both surfaces of the plate metal; and provides products and procedures which solve problems longstanding in the art, and achieve the new results indicated.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention, and the new procedures are by way of example, and the scope of the invention is not limited to the exact details, sizes, etc. described or shown because various products of various sizes incorporating the fundamental structures may be manufactured by the fundamental procedures and concepts of the invention without departing from the fundamental principles set forth.

The term "plate metal" is used herein to refer to various gauges of material, whether technically known as sheet or plate metal, and it is understod that the term "plate metal" is used comprehensively to include both sheet and plate metal.

Having now described the features, discoveries and principles of the invention, the characteristics of the new products, the manner in which the new procedures may be carried out, and the advantageous, new and useful results obtained thereby; the new and useful methods, steps, procedures and discoveries, and mechanical equivalents obvious to those skilled in the art are set forth in the appended claims.

I claim:

1. In a method of making a plate metal product having an extruded sleeve projecting integrally from both surfaces of the product; the steps of forming a plate metal blank with a dome-like formation presenting opposite concave and convex surface portions and with a first extruded tubular sleeve portion projecting integrally from said concave surface portion, and then flattening said dome-like formation and at the same time cold extruding a second tubular sleeve portion from metal in the dome-like formation projecitng in the opposite direction from the plate metal blank and aligned with said first sleeve portion.

2. The method defined in claim 1 including the step of roll-tapping threads in the sleeve after the sleeve portions extending from both surfaces of the blank have been extruded.

3. The method defined in claim 1 in which the forming of a dome-like formation with an integral extruded sleeve portion is carried out by piercing a hole through the blank, by then shaving the annular surface of the pierced hole to eliminate normal metal breakout resulting from piercing, by then reforming the blank annularly around the shaved hole to dome-like formation with opposite concave and convex surfaces, and by then cold extruding said first tubular sleeve portion to desired length from blank metal in the dome-like formation surrounding the shaved hole to project from said concave surface portion of the blank.

References Cited

UNITED STATES PATENTS

| | | | |
|---|---|---|---|
| 746,453 | 12/1903 | Buch | 287—189.36 |
| 2,460,721 | 2/1949 | Thompson | 85—32 |
| 2,738,574 | 3/1956 | Riggs | 72—377 |
| 3,060,562 | 10/1962 | Fransson | 10—86 |
| 3,123,910 | 3/1964 | Nellson | 72—342 |

CHARLES W. LANHAM, Primary Examiner

E. M. COMBS, Assistant Examiner

U.S. Cl. X.R.

10—86; 72—377, 379